United States Patent
Tsubouchi (10) Patent No.: US 10,270,683 B2
(45) Date of Patent: Apr. 23, 2019

(54) COMMUNICATION METHOD, COMMUNICATION DEVICE, AND RECORDING MEDIUM FOR STREAMING

(71) Applicant: FUJITSU LIMITED, Kawasaki-shi, Kanagawa (JP)

(72) Inventor: Masatoshi Tsubouchi, Kawasaki (JP)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 132 days.

(21) Appl. No.: 15/231,007

(22) Filed: Aug. 8, 2016

(65) Prior Publication Data
US 2017/0063945 A1  Mar. 2, 2017

(30) Foreign Application Priority Data
Sep. 1, 2015 (JP) ................................. 2015-172061

(51) Int. Cl.
*H04L 12/707* (2013.01)
*H04L 29/06* (2006.01)
*H04W 88/02* (2009.01)

(52) U.S. Cl.
CPC .......... *H04L 45/24* (2013.01); *H04L 65/1059* (2013.01); *H04L 65/4084* (2013.01); *H04L 65/80* (2013.01); *H04W 88/02* (2013.01)

(58) Field of Classification Search
CPC ..................................................... H04L 45/24
See application file for complete search history.

(56) References Cited

U.S. PATENT DOCUMENTS

| 7,027,455 | B2 * | 4/2006 | Floyd ................. H04Q 11/0421 370/394 |
| 7,092,615 | B2 | 8/2006 | Nichols |
| 8,447,831 | B1 * | 5/2013 | Sivasubramanian ........ H04L 61/1511 709/217 |
| 8,880,647 | B2 * | 11/2014 | Pantos .................... H04L 67/06 709/203 |
| 9,191,465 | B2 * | 11/2015 | Watson ................... H04L 69/14 |
| 9,917,791 | B1 * | 3/2018 | Goldfain ................. G06F 21/10 |

(Continued)

FOREIGN PATENT DOCUMENTS

| EP | 2 362 651 A1 | 8/2011 |
| JP | 2008-135825 A | 6/2008 |

(Continued)

OTHER PUBLICATIONS

Extended Search Report dated Jan. 13, 2017, issued in European Application No. 16182986.6 (8 pages).

(Continued)

*Primary Examiner* — Jerry B Dennison
(74) *Attorney, Agent, or Firm* — Westerman, Hattori, Daniels & Adrian, LLP (57) ABSTRACT

A portable information device includes an acquiring unit, a reproducing unit, and an issuing unit. The acquiring unit acquires data by using a network. The reproducing unit conducts streaming reproduction of the data that is acquired by the acquiring unit. The issuing unit divides unacquired data in the neighborhood of the reproduction position for streaming reproduction of the acquired data and issues, to the acquiring unit, a task for executing acquisition of the data for each divided position.

5 Claims, 6 Drawing Sheets

(56) References Cited

U.S. PATENT DOCUMENTS

| | | |
|---|---|---|
| 2002/0044606 A1 | 4/2002 | Togashi |
| 2004/0172476 A1* | 9/2004 | Chapweske ............. H04L 29/06 709/231 |
| 2010/0146569 A1 | 6/2010 | Janardhan et al. |
| 2010/0325301 A1 | 12/2010 | Kwon et al. |
| 2011/0055328 A1* | 3/2011 | Lahr ..................... H04L 67/104 709/204 |
| 2011/0106964 A1* | 5/2011 | Bennett ............... H04L 65/4069 709/231 |
| 2011/0225302 A1 | 9/2011 | Park et al. |
| 2012/0311174 A1 | 12/2012 | Bichot et al. |
| 2013/0095806 A1 | 4/2013 | Salkintzis et al. |
| 2013/0103849 A1* | 4/2013 | Mao ................... H04N 21/8456 709/231 |
| 2013/0227102 A1* | 8/2013 | Beck ................... H04L 65/4084 709/223 |
| 2013/0232228 A1* | 9/2013 | Ramamurthy .......... H04L 65/80 709/219 |
| 2014/0052846 A1* | 2/2014 | Scherkus ......... H04N 21/44209 709/224 |
| 2014/0129893 A1* | 5/2014 | Rigaudeau ........... H04L 1/1838 714/748 |
| 2014/0143431 A1* | 5/2014 | Watson ............... H04L 65/4084 709/227 |
| 2014/0189099 A1* | 7/2014 | Hurst ................... H04N 21/437 709/224 |
| 2014/0259082 A1* | 9/2014 | Broome ................. H04L 67/32 725/86 |
| 2015/0341632 A1 | 11/2015 | Syed et al. |
| 2017/0063945 A1* | 3/2017 | Tsubouchi .......... H04L 65/4084 |
| 2017/0063955 A1* | 3/2017 | Tsubouchi ............ H04L 65/601 |
| 2018/0041375 A1* | 2/2018 | Takeuchi ................ H04L 29/06 |

FOREIGN PATENT DOCUMENTS

| | | |
|---|---|---|
| JP | 2013-520119 A | 5/2013 |
| WO | 2009/142059 A1 | 11/2009 |

OTHER PUBLICATIONS

European Seach Report dated Jan. 24, 2017, issued in European Application No. 16183809.9 counterpart to U.S. Appl. No. 15/237,016 (9 pages).
Office Action dated Dec. 5, 2018, issued in counterpart European Application No. 16183809.9. (7 pages).
Non-Final Office Action dated Oct. 26, 2018, issued in U.S. Appl. No. 15/237,016. (22 pages).
Office Action dated Feb. 19, 2019, issued in counterpart Japanese Application No. 2015-172182, with English machine translation. (9 pages).
Office Action dated Feb. 19, 2019, issued in counterpart Japanese Application No. 2015-172061, with English machine translation. (6 pages).

* cited by examiner

ALREADY CACHED

COMMUNICATION METHOD, COMMUNICATION DEVICE, AND RECORDING MEDIUM FOR STREAMING

CROSS-REFERENCE TO RELATED APPLICATION

This application is based upon and claims the benefit of priority of the prior Japanese Patent Application No. 2015-172061, filed on Sep. 1, 2015, the entire contents of which are incorporated herein by reference.

FIELD

The embodiment discussed herein is related to a communication method, a communication device, and a recording medium.

BACKGROUND

There is a method for mobile terminals to, for example, divide a single content into N sets of data and simultaneously download them. According to this method, high-speed data communication may be achieved by simultaneously downloading the data that has been divided into N sets. Furthermore, mobile terminals perform streaming communication to reproduce data, such as moving images, while downloading it. When the streaming communication is performed, mobile terminals may reproduce data during download of the data.

[Patent Literature 1] International Publication Pamphlet No. 2009/142059

However, with the mobile terminals, as a task, such as download, is equally executed for each set of divided data, if it is difficult to execute a task at the reproduction position, streaming reproduction is not executable. Therefore, in actuality, there is demand for a system to preferentially execute a task at the reproduction position.

SUMMARY

According to an aspect of an embodiment, a communication method is implemented by a communication device. The communication method includes acquiring data by using a network. The communication method includes conducting streaming reproduction of acquired data. The communication method includes dividing unacquired data in neighborhood of a reproduction position for streaming reproduction of the acquired data and issuing a task for conducting acquisition of the data for each divided position.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. Here, the disclosed technology is not limited to the present embodiment. Furthermore, each embodiment, which is described below, may be appropriately combined to the extent that there is no contradiction.

Figure 1:
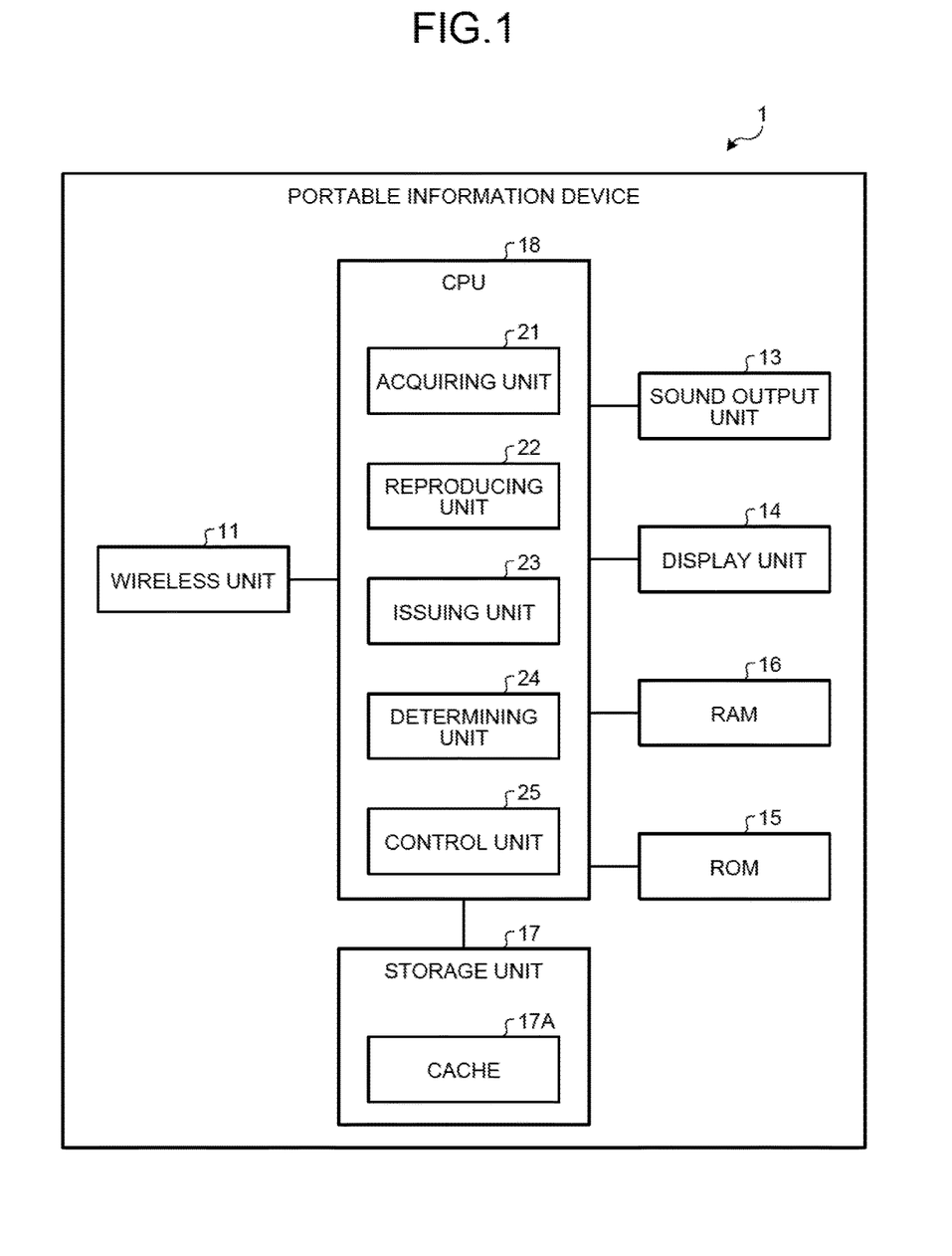
FIG. 1 is an explanatory diagram that illustrates an example of the configuration of a portable information device according to the present embodiment.

FIG. 1 is an explanatory diagram that illustrates an example of the configuration of a portable information device 1 according to the present embodiment. The portable information device 1, illustrated in FIG. 1, is for example a mobile phone, Personal Digital Assistant (PDA), a personal computer, or a car navigation system. The portable information device 1 includes a wireless unit 11, a sound output unit 13, a display unit 14, a read only memory (ROM) 15, a random access memory (RAM) 16, a storage unit 17, and a central processing unit (CPU) 18.

The wireless unit 11 is a wireless unit that performs a wireless communication by using a network, e.g., Wi-Fi (registered trademark). The wireless unit 11 is capable of accessing an undepicted content server by using the network to acquire (download) streaming data from the content server. The sound output unit 13 is an output interface for sound output of, for example, video data or audio data. The display unit 14 is an output interface for displaying various types of information. The ROM 15 is a memory area that stores various types of information, e.g., programs. The RAM 16 is an area that stores various types of information. The storage unit 17 is an area that stores various types of data, such as streaming data. In the storage unit 17, there is a cache 17A that temporarily stores acquired streaming data. The CPU 18 performs overall control of the portable information device 1.

The ROM 15 is an area that stores for example communication programs. The CPU 18 reads a communication program, stored in the ROM 15, and runs various processes as functions in accordance with the read communication program. The CPU 18 runs an acquiring unit 21, a reproducing unit 22, an issuing unit 23, a determining unit 24, and a control unit 25 as functions.

The acquiring unit 21 acquires data by using the network via the wireless unit 11 and stores the acquired data in the cache 17A. The reproducing unit 22 conducts streaming reproduction of the data that is stored in the cache 17A, and it outputs the reproduced contents to the sound output unit 13 and the display unit 14.

Figure 2:
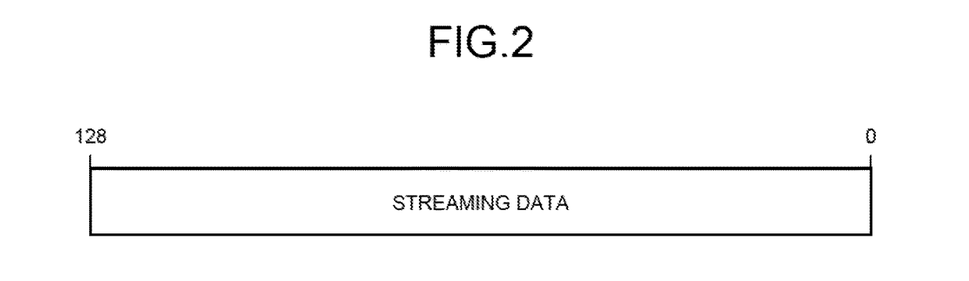
FIG. 2 is an explanatory diagram that illustrates an example of the streaming data.

FIG. 2 is an explanatory diagram that illustrates an example of the streaming data. In the streaming data that is illustrated in FIG. 2, the level of priority of 0 to 128 is set to each position, e.g., 129 positions, from the beginning to the end, the level of priority of "128" is set to the beginning position, and the level of priority of "0" to the end position. Specifically, the entire streaming data is divided into 129, and the levels of priority of "128" to "0" are set to the 129 positions from the beginning position to the end position. Furthermore, the level of priority of "128" ranks at the top, and the level of priority of "0" ranks at the bottom. That is, the task with the level of priority of "128" is conducted with the highest priority. The acquiring unit 21 starts an operation to acquire the beginning data of x MB, e.g., 1024 bytes, from the beginning position of the streaming data with the highest priority. Here, the beginning data corresponds to the header of the content file that is streaming data, and the header registers the size of the file and the possibility of division.

The issuing unit 23 divides unacquired data in the neighborhood of the reproduction position for streaming reproduction and issues a task to the wireless unit 11 for each divided position. The issuing unit 23 issues a task to the wireless unit 11 so as to enable high-speed download while priority is given to acquisition at the reproduction position for streaming.

Figure 3:
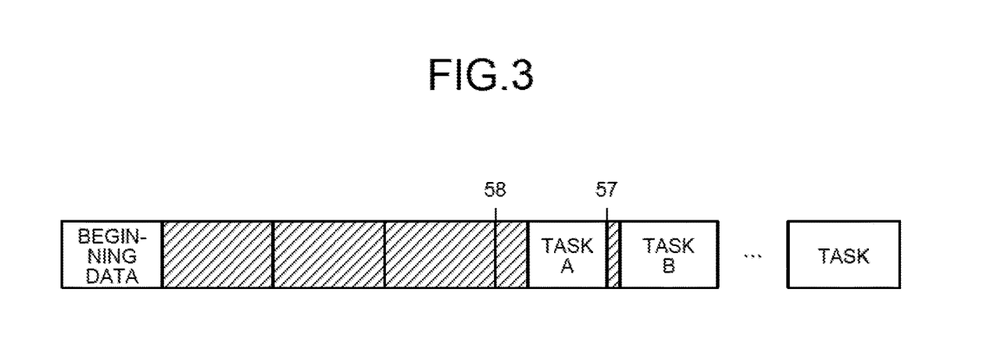
FIG. 3 is an explanatory diagram that illustrates an example of the level of priority of each task.

With regard to each issued task, the issuing unit 23 sets the level of priority for conducting the task. The wireless unit 11 executes the issued tasks in descending order of the level of priority. FIG. 3 is an explanatory diagram that illustrates an example of the level of priority of each task. As illustrated in FIG. 3, as a task A with the level of priority "58" ranks high, the wireless unit 11 preferentially executes the task A with the level of priority "58" while executing a task B with the level of priority "57".

The control unit 25 performs overall control of the CPU 18. At the start of acquisition of streaming data, the control unit 25 controls the issuing unit 23 so as to issue, to the wireless unit 11, the task for conducting acquisition of the beginning data of the streaming data. The control unit 25 adds up the communication volumes of the network and calculates the throughput of the network on the basis of the added communication volumes. Here, according to a method of calculating the throughput, for example, it is calculated by using ([previous throughput]×3+[communication volume of previous 1 second])/4. Furthermore, the control unit 25 uses the expression [throughput]×Math.pow(1.01, [number of task successes for previous 1 second])×Math.pow(0.8, [number of task failures for previous 1 second]) to correct the calculated throughput and calculates the network reliability in 1 second. Furthermore, the control unit 25 uses the expression [network reliability]/minimum throughput (fixed value) needed to execute 1 task] to calculate the optimum number of issued division tasks for the network, i.e., the optimum task number.

The determining unit 24 determines whether equal to or more than a predetermined volume of data, which is in succession from the current reproduction position, has been acquired. Here, the predetermined volume is, for example, the amount of acquired cache (y MB), e.g., 2 MB, which is in succession from the current reproduction position. If equal to or more than a predetermined volume of data, which is in succession from the current reproduction position, has been acquired, i.e., if the acquired cache, which is in succession from the reproduction position of streaming, is equal to or more than y MB, e.g., 2 MB, the control unit 25 sets the maximum issuance number to M2, e.g., "4". That is, as the amount of acquired cache is equal to or more than y MB, a certain degree of delay in the progress of the cache is allowed; therefore, the maximum issuance number may be increased.

Furthermore, if the data, which is in succession from the reproduction position, is not equal to or more than the predetermined volume, i.e., the acquired cache, which is in succession from the streaming reproduction position, is not equal to or more than y MB, the control unit 25 reduces the maximum issuance number to set M1, e.g., "2". That is, an increase in the number of tasks causes a reduction in the resources of the CPU 18, which are assigned to the tasks at or around the reproduction position, even though the throughput of the network is desirable; therefore, it depends on the performance of the CPU 18, and a delay occurs in the task at the reproduction position, which needs to be given priority.

When seek reproduction is conducted at any reproduction position of data, the control unit 25 determines whether the data at the reproduction position, i.e., the seek destination, has been cached in the cache 17A. If the data at the seek destination has been cached, the control unit 25 continues processing of the task that is in execution. Furthermore, if the data at the seek destination has not been cached, the control unit 25 stops the processing of the task that is in execution and controls the issuing unit 23 so as to issue the task for acquiring unacquired data at the seek destination.

Next, an explanation is given of an operation of the portable information device 1 according to the present embodiment. If the target data is the target for streaming, the CPU 18 starts an operation to acquire the beginning data of the streaming data on the top priority. Here, the streaming target is determined depending on the settings of ON/OFF of high-speed streaming of the portable information device 1, or the usage condition of the used application, or the like.

Figure 4:
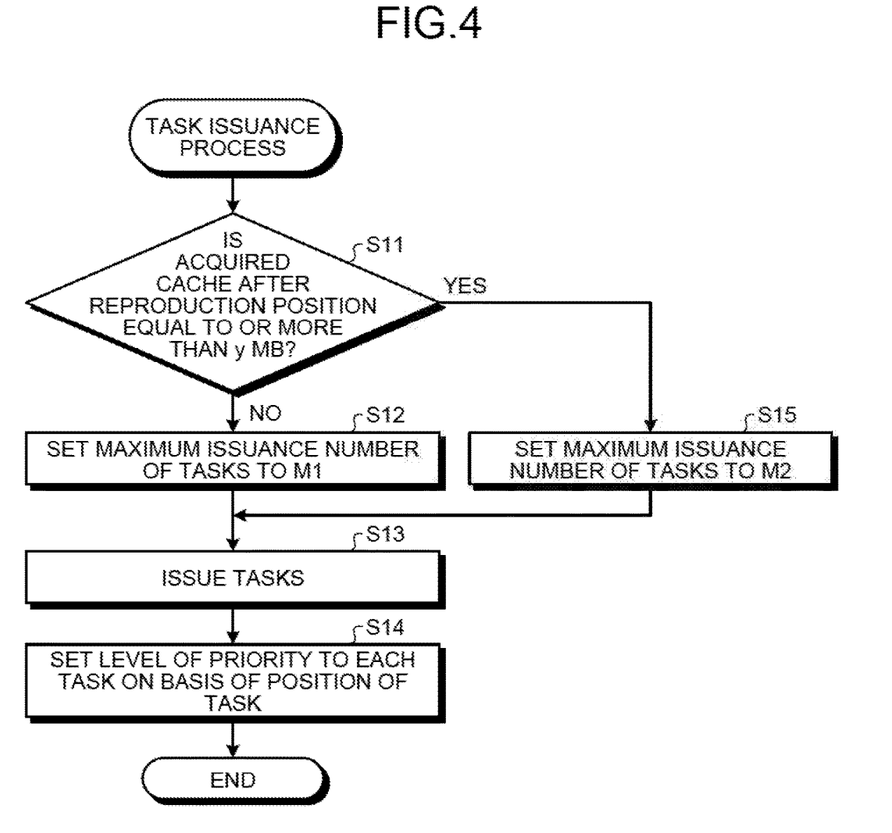
FIG. 4 is a flowchart that illustrates an example of the processing procedure of a CPU in relation to a task issuance process.

FIG. 4 is a flowchart that illustrates an example of the processing procedure of the CPU 18 in relation to a task issuance process. The task issuance process, illustrated in FIG. 4, is a process to set the maximum issuance number on the basis of the acquired cache after the current reproduction position and to issue a task in the range of the maximum issuance number. In FIG. 4, the determining unit 24 of the CPU 18 determines whether the acquired cache, which is in succession after the reproduction position, is equal to or more than a predetermined volume, e.g., y MB (Step S11). If the acquired cache after the reproduction position is not equal to or more than y MB (No at Step S11), the control unit 25 sets the maximum issuance number of division tasks to M1 (Step S12). Here, the maximum issuance number M1 has a relationship of M1<M2. That is, as the amount of acquired cache is small and there is no allowance for streaming reproduction, the resources of the CPU 18 may be saved by decreasing the maximum issuance number while priority is given to acquisition at the reproduction position.

The issuing unit 23 issues division tasks (Step S13), sets the level of priority to each of the division tasks on the basis of the position of the issued division task (Step S14), and terminates the processing procedure that is illustrated in FIG. 4.

If the acquired cache, which is in succession after the reproduction position, is equal to or more than y MB (Yes at Step S11), the control unit 25 sets the maximum issuance number of the division tasks to M2 (Step S15) and proceeds to Step S13 so as to make the issuing unit 23 issue a division task. That is, as the amount of acquired cache is large and there is an allowance for streaming reproduction, the maximum issuance number may be increased while priority is given to acquisition at the reproduction position.

If the acquired cache, which is in succession after the current reproduction position, is not equal to or more than the predetermined volume, the CPU 18, which performs the task issuance process that is illustrated in FIG. 4, reduces the maximum issuance number to set M1. As a result, if the acquired cache is not equal to or more than the predetermined volume, it is determined that there is no allowance for streaming reproduction, and the resources of the CPU 18 may be saved by decreasing the maximum issuance number while priority is given to acquisition at the reproduction position.

If acquired cache, which is in succession after the current reproduction position, is equal to or more than the predetermined volume, the CPU 18 increases the maximum issuance number to set M2. As a result, if the acquired cache is equal to or more than the predetermined volume, it is determined that there is an allowance for streaming reproduction, and high-speed streaming may be achieved by increasing the maximum issuance number.

On the basis of the position of an issued task, the CPU 18 sets the level of priority to the task. As a result, the CPU 18 may execute each task in descending order of the level of priority.

Figure 5:
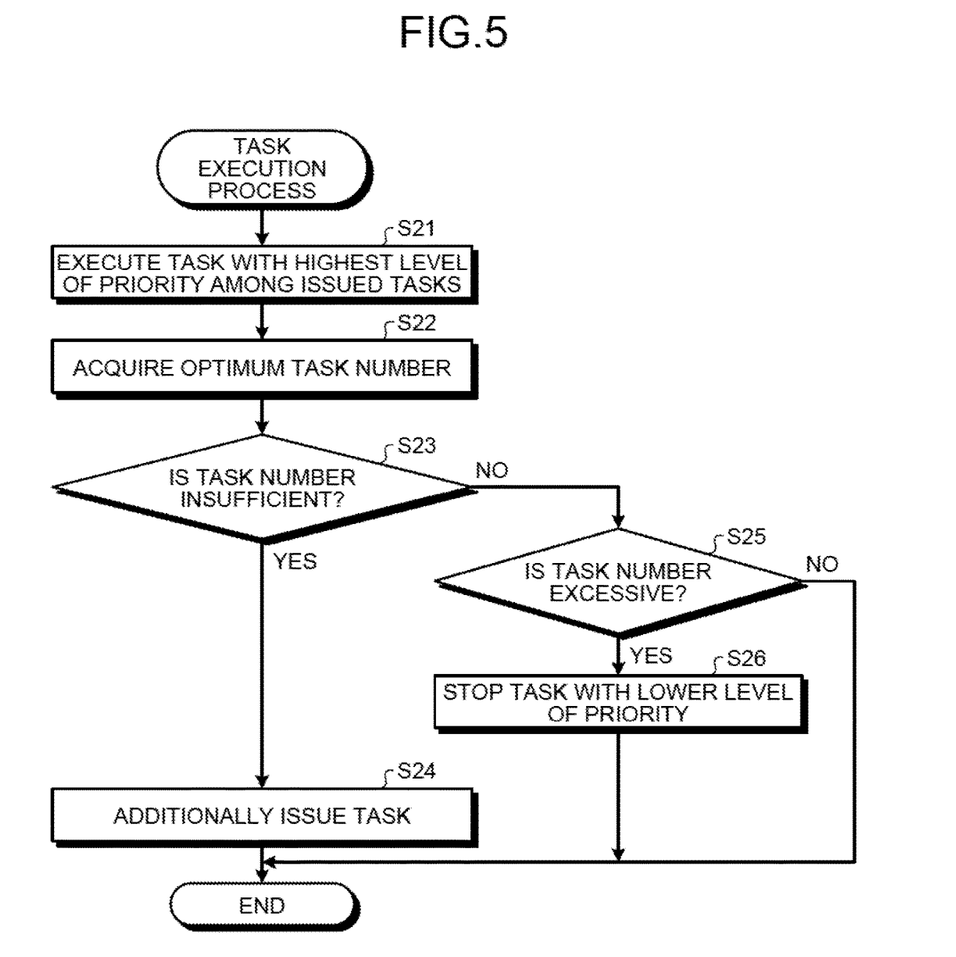
FIG. 5 is a flowchart that illustrates an example of the processing procedure of the CPU in relation to a task execution process.

FIG. 5 is a flowchart that illustrates an example of the processing procedure of the CPU 18 in relation to a task execution process. The task execution process, illustrated in FIG. 5, is a process to compare the current task number and the optimum task number and to adjust the issued-task number on the basis of a comparison result. In FIG. 5, the control unit 25 of the CPU 18 executes the task with the highest level of priority among the issued tasks (Step S21) and acquires the optimum task number (Step S22).

The control unit 25 determines whether the current task number is insufficient on the basis of the acquired optimum task number (Step S23). Here, it is possible to determine whether the task number is insufficient based on whether the current task number is less than the optimum task number. If the current task number is insufficient (Yes at Step S23), i.e., if the current task number is less than the optimum task number, the issuing unit 23 executes a task addition process to add a task (Step S24) and terminates the processing procedure that is illustrated in FIG. 5.

If the current task number is not insufficient (No at Step S23), the control unit 25 determines whether the current task number is excessive on the basis of the acquired optimum task number (Step S25). Here, it is possible to determine whether the task number is excessive based on whether the current task number exceeds the optimum task number. If the current task number is excessive (Yes at Step S25), i.e., if the current, task number exceeds the optimum task number, the issuing unit 23 stops the task with the lower level of priority among the issued tasks (Step S26) and terminates the processing procedure that is illustrated in FIG. 5. Furthermore, if the current task number is not excessive (No at Step S25), the control unit 25 terminates the processing procedure that is illustrated in FIG. 5.

If the current task number is insufficient as compared to the optimum task number, the CPU 18, which executes the task execution process that is illustrated in FIG. 5, adds a new task. As a result, it is possible to add a new task within the range of the optimum task number, whereby high-speed streaming may be achieved.

If the current task number is excessive as compared to the optimum task number, the CPU 18 stops the processing of the task with a low level of priority among the issued tasks. As a result, the resources of the CPU 18 may be saved; therefore, high-speed streaming may be achieved by reducing the loads on the CPU 18. Furthermore, as a task with a low level of priority is stopped, resuming of the task may be conducted effectively.

The CPU 18 is capable of executing a task in accordance with a level of priority and adjusting the task number within the range of the optimum task number.

Figure 6:
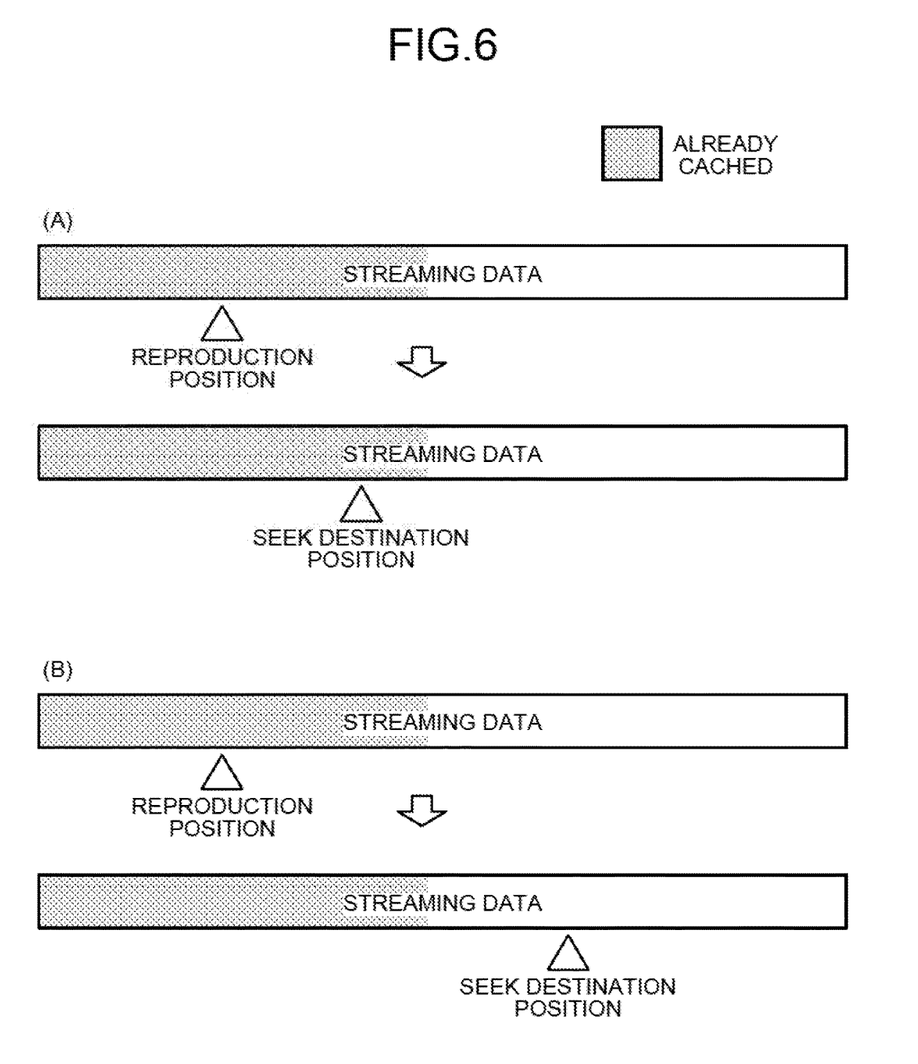
FIG. 6 is an explanatory diagram that illustrates an example of the procedure of the task execution process during a seek operation.

FIG. 6 is an explanatory diagram that illustrates an example of the procedure of the task execution process during a seek operation. The seek operation is an operation to seek a desired reproduction position in streaming data. With the seek pattern in (A) of FIG. 6, if the cache has been acquired at the seek destination, the task in the unacquired area is continuously executed as usual. With the seek pattern in (B) of FIG. 6, if the cache has not been acquired at the seek destination, the task before the seek operation is stopped and the level of priority of the task at the seek destination is set as the top so that the data at the seek destination may be acquired with the highest priority.

According to the present embodiment, during the streaming communication, instead of dividing the entire streaming data into N, the data in the neighborhood of the reproduction position is divided and is preferentially acquired. As a result, priority is given to acquisition of data in the neighborhood of the reproduction position, whereby high-speed streaming may be achieved. Furthermore, when data in the neighborhood of the reproduction position is acquired, priority is given to a task in the neighborhood of the reproduction position without executing other tasks; therefore, consumption of the resources of the CPU 18 may be reduced. As a result, as consumption of the resources of the CPU 18 is reduced, high-speed streaming may be achieved.

The CPU 18 according to the present embodiment divides unacquired data in the neighborhood of the reproduction position for streaming reproduction, and it issues a task for each divided position to the wireless unit 11. As a result, the CPU 18 preferentially executes a task in the neighborhood of the reproduction position, whereby high-speed streaming communication may be achieved.

When the CPU 18 starts to acquire the streaming data, it issues the task for acquiring the beginning data of the streaming data to the wireless unit 11. As a result, the CPU 18 may acquire the beginning data with the highest priority.

The CPU 18 determines whether equal to or more than a predetermined volume of data, which is in succession from the current reproduction position, has been acquired and, if equal to or more than a predetermined volume of data, which is in succession from the reproduction position, has been acquired, it increases the number of tasks that may be issued. As a result, as equal to or more than a predetermined volume of data is acquired, it is determined that there is an allowance for streaming reproduction, and high-speed streaming may be achieved by increasing the maximum issuance number.

If equal to or more than a predetermined volume of data, which is in succession from the reproduction position, has not been acquired, the CPU 18 reduces the number of tasks that may be issued. As a result, as equal to or more than a predetermined volume of data is not acquired, it is determined that there is no allowance for streaming reproduction, and the resources of the CPU 18 may be saved by decreasing the maximum issuance number while priority is given to acquisition at the reproduction position.

The CPU 18 sets the level of priority to each issued task and executes the tasks in descending order of the level of priority. As a result, the CPU 18 may execute each task preferentially in descending order of the level of priority.

The CPU 18 preferentially acquires the data in the neighborhood of the reproduction position that is the seek destination during seeking of the streaming reproduction. Furthermore, if the data at the seek destination has not been acquired during the seeking of streaming reproduction, the CPU 18 acquires the data at the seek destination with the highest priority. As a result, it is possible to handle seek reproduction while high-speed streaming is achieved.

Furthermore, although the above-described embodiment illustrates the Wi-Fi network as an example, it may be wireless networks, such as Long Term Evolution (LTE) network, 3G network, infrared rays, or Bluetooth (registered trademark), or it may be applied to wired networks, such as optical network or electric network.

Although the above-described embodiment illustrates the portable information device 1 as an example, it is not limited to portable information devices but it may be applied to communication devices that have a communication function for multiple networks.

According to the above-described embodiment, the level of priority of the beginning position of the streaming data is set to "128" and the level of priority of the end position thereof is set to "0" so that the levels of priority "128" to "0" are set to the 129 fixed positions from the beginning position to the end position. However, the level of priority may be appropriately set at the position within the data of the unacquired section instead of fixing it at the positions of the entire streaming data. Furthermore, although the levels of priority "0" to "128" are set, there is no limitation on the numbers, and changes may be appropriately made.

Furthermore, components of each unit illustrated do not always need to be physically configured as illustrated in the drawings. Specifically, specific forms of separation and combination of each unit are not limited to those depicted in the drawings, and a configuration may be such that all or some of them are functionally or physically separated or combined in an arbitrary unit depending on various types of loads, usage conditions, or the like.

Furthermore, all or any parts of various processing functions performed by each device may be implemented by a central processing unit (CPU) (or a microcomputer such as a micro processing unit (MPU) or a micro controller unit (MCU)). Moreover, it is self-evident that all or any parts of the various processing functions may be implemented by programs analyzed and executed by a CPU (or a microcomputer such as an MPU or MCU) or by wired logic hardware.

Figure 7:
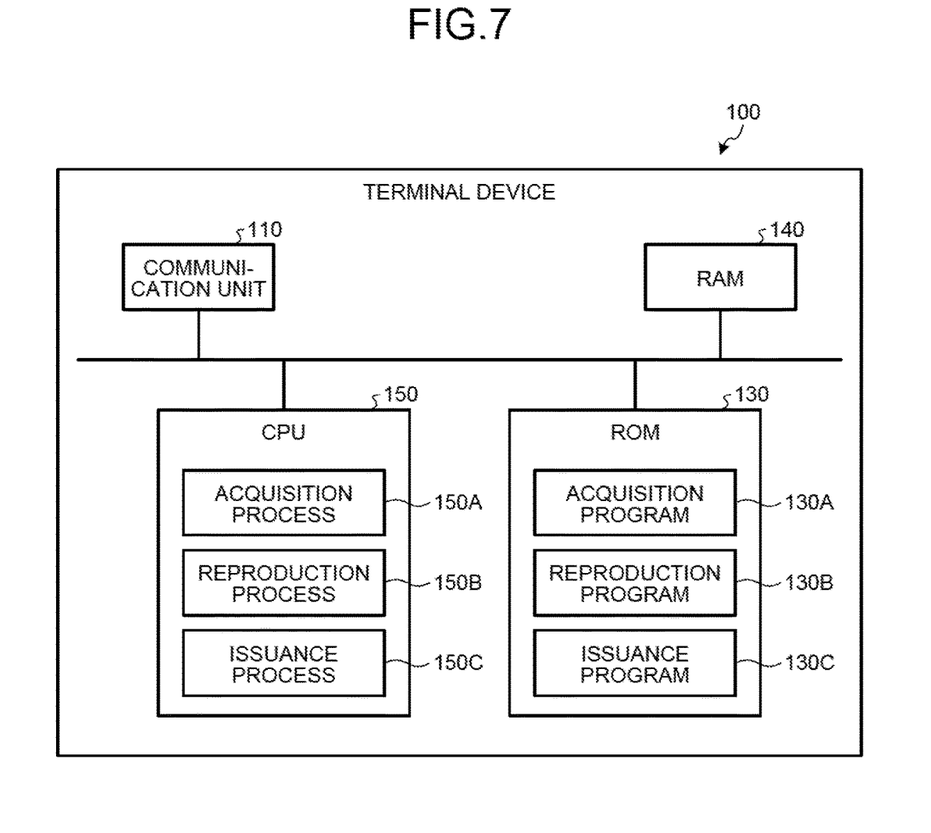
FIG. 7 is an explanatory diagram that illustrates an example of a terminal device that executes a communication program.

Furthermore, various processes, explained in the present embodiment, may be implemented when a prepared program is executed by a processor, such as a CPU, in a terminal device. Therefore, an explanation is given below of an example of the terminal device that executes the program that has the same function as that in the above-described embodiment. FIG. 7 is an explanatory diagram that illustrates an example of the terminal device that executes a communication program.

A terminal device 100, which executes the communication program that is illustrated in FIG. 7, includes a communication unit 110, a ROM 130, a RAM 140, and a CPU 150. Furthermore, the communication unit 110, the ROM 130, the RAM 140, and the CPU 150 are connected via a bus. The communication unit 110 accesses an undepicted content server by using a network to acquire data from the content server.

Furthermore, the ROM 130 previously stores the communication program that performs the same function as that in the above-described embodiment. The ROM 130 stores, as communication programs, an acquisition program 130A, a reproduction program 130B, and an issuance program 130C. Furthermore, instead of the ROM 130, the communication program may be recorded in a recording medium that is readable by a computer by using an undepicted drive. Moreover, the recording medium may be, for example, a portable recording medium, such as CD-ROM, DVD disk, or USB memory, or a semiconductor memory, such as a flash memory.

Then, the CPU 150 reads the acquisition program 130A from the ROM 130 to function as an acquisition process 150A. Furthermore, the CPU 150 reads the reproduction program 130B from the ROM 130 to function as a reproduction process 150B. The CPU 150 reads the issuance program 130C from the ROM 130 to function as an issuance process 150C.

The CPU 150 acquires data by using a network. The CPU 150 conducts streaming reproduction of acquired data. Furthermore, the CPU 150 divides unacquired data in the neighborhood of the reproduction position for streaming reproduction of the acquired data, and it issues a task for conducting acquisition of data for each divided position. As a result, as the CPU 150 divides unacquired data in the neighborhood of the reproduction position and issues a task for each of the divided positions, high-speed streaming may be achieved.

High-speed streaming communication may be achieved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication method that is implemented by a communication device, the communication method comprising:

conducting streaming reproduction of data, the data including acquired data from a network and data not yet acquired from the network;

when the streaming reproduction is at a reproduction position of the data involving the data not yet acquired from the network, dividing acquiring of the data not yet acquired into a plurality of tasks, each of the plurality of tasks acquiring a portion of the data not yet acquired that is smaller than a size of the data not yet acquired;

issuing each of the plurality of tasks for execution by a processor;

setting a level of priority for executing each of the plurality of tasks such that a higher level of priority is set for a task in the plurality of tasks that acquires the data not yet acquired that is located closer to the reproduction position; and executing the plurality of tasks in descending order of the level of priority for each of the plurality of tasks.

2. The communication method according to claim 1, further comprising:

determining whether the acquired data is equal to or more than a predetermined volume of the data sequentially following a current reproduction position of the data;

when the determining determines that the acquired data is equal to or more than the predetermined volume of the data sequentially following the current reproduction position of the data, is acquired, increasing a number of the plurality of tasks that can be issued; and when the determining determines that the acquired data is not equal to or more than the predetermined volume of the data sequentially following the current reproduction position of the data, decreasing the number of the plurality of tasks that can be issued.

3. The communication method according to claim 1, further comprising:
when seek reproduction is conducted at any reproduction position of the data, determining whether the data at a seek destination is the data not yet acquired; and
when the data at the seek destination is the data not yet acquired, stopping execution of a current task by the processor and issuing a task to acquire the data not yet acquired at the seek destination.

4. A communication device comprising:
an acquiring unit that acquires data by using a network;
a reproducing unit that conducts streaming reproduction of data, the data including acquired data that is acquired by the acquiring unit and data not yet acquired from the network; and
an issuing unit that divides acquiring of the data not yet acquired into a plurality of tasks when the streaming reproduction is at a reproduction position of the data involving the data not yet acquired from the network, and issues each of the plurality of tasks for execution by a processor, wherein
each of the plurality of tasks acquires a portion of the data not yet acquired that is smaller than a size of the data not yet acquired issues a plurality of tasks for execution by a processor,
each of the plurality of tasks has a level of priority such that a higher level of priority is set for a task in the plurality of tasks that acquires the data not yet acquired that is located closer to the reproduction position, and
the plurality of tasks are executed by the processor in descending order of the level of priority for each of the plurality of tasks.

5. A non-transitory computer-readable recording medium having stored therein a communication program that causes a communication device to execute a process comprising:
conducting streaming reproduction of data, the data including acquired data from a network and data not yet acquired from the network;
when the streaming reproduction is at a reproduction position of the data involving the data not yet acquired from the network, dividing acquiring of the data not yet acquired into a plurality of tasks, each of the plurality of tasks acquiring a portion of the data not yet acquired that is smaller than a size of the data not yet acquired;
issuing each of the plurality of tasks for execution by a processor;
setting a level of priority for executing each of the plurality of tasks such that a higher level of priority is set for a task in the plurality of tasks that acquires the data not yet acquired that is located closer to the reproduction position; and
executing the plurality of tasks in descending order of the level of priority for each of the plurality of tasks.

* * * * *